Patented June 6, 1933

1,913,244

UNITED STATES PATENT OFFICE

FELIX REIMANN, OF BERLIN-CHARLOTTENBURG, GERMANY

COMPOSITION OF MATTER FOR BUILDING PURPOSES

No Drawing. Application filed October 24, 1929, Serial No. 402,305, and in Germany May 21, 1929.

My invention relates to improvements in a composition of matter for building purposes, and the object of the improvements is to provide a composition which has high density and impermeability to water, and which is free of pores. The composition consists of cumarone resin combined by melting with filling media particularly mineral filling media. Among the resins which are different with respect to their grain I prefer those which are tough-hard, because the brittle sorts are subject to breaking and too hard, and the soft sorts are not hard enough. If the composition is used under conditions where it must withstand temperatures above 40° C., as is the case for example in the construction of roads, I melt the cumarone resin with a hard wax or hydrocarbons of high molecular weight such as anthracene, pinene, and the like for raising the melting point. For example, by adding 10% of raw carnauba wax the softening point of a cumarone resin which ordinarily becomes soft at a temperature of from 45 to 50° can be raised to from 80 to 90°. The tough hardness of the cumarone resin or its mixture with filling media or hard wax or hard hydrocarbons can be increased by adding about 4 parts of caoutchouc to 100 parts of cumarone resin. With 100 parts of a binding medium thus produced about 700 parts of a suitable filling medium containing for example 100 parts of coloring pigment are combined. Preferably I use such pigments which contain sulfur, particularly lithopones having a high proportion of sulfide. Other colors can be produced by adding mineral pigments in addition to lithopone. Preferably the caoutchouc is added in the form of a concentrated solution to molten cumarone resin or a mixture of cumarone resin and wax, a 30% solution being preferred. The filling matter added to the resin depends on the intended use of the composition. In many cases the addition of fine marble meal together with a high proportion of rough pieces of marble has been found advisable, particularly in the construction of roads where a rough surface is desired.

The composition is manufactured for example by first melting 1 part of carnauba wax with 10 parts of a suitable cumarone resin, whereupon to the molten product a concentrated solution of crude caoutchouc is admixed, the amount of the said solution being substantially equal to or larger than the amount of the carnauba wax. Thereafter, while continuously stirring the matter, lithopone is gradually added at the rate of 1½ parts of lithopone to 1 part of cumarone resin, and after the said lithopone has been uniformly distributed fine marble meal and rough pieces of marble are added, the amount of the marble meal being equal to the cumarone resin, and the amount of the pieces of marble being about 6 to 7 times that of the meal. At a temperature of from 100 to 120° the said composition is in the form of a pulp suitable for casting, and it may be cast in moulds for making therefrom bricks or other blocks for use in building, or it is directly cast on the road. The product can be used for example in concrete building as an insulating wall covering, and in the construction of roads it can be used for making signs, or marking tennis or other sporting grounds. In the construction of roads it can be used in connection or as a substitute for asphalt. It has a high value as a material for embedding rails in roads as a substitute for asphalt, which asphalt is subject to destruction near the rails by the vibration of the cars. The material is impermeable to water, and therefore it is not subject to destruction by frost. It binds with asphalt and dry cement, particularly when preheating the surfaces at a temperature of from 40 to 50° C. Therefore it is suitable for coating cement and asphalt coatings, which coatings are made waterproof by the composition. The composition does not directly bind with wood or iron, and for producing a durable coating for wood I first coat the wood with a layer of bituminous matter, and thereafter I apply thereto the new composition. For coating iron I first apply a coating of asphalt, to which the composition is applied.

I claim:

1. A composition of matter capable of being molded into a hard and tough body for structural purposes comprising a mixture of 100 parts of cumarone resin, approximately 10 parts of carnauba wax, approximately four parts of caoutchouc, and a filling medium.

2. A composition of matter capable of being molded into a hard and tough body for structural purposes comprising a mixture of 100 parts of cumarone resin, approximately 10 parts of a substance adapted to raise the melting temperature of the resin and selected from the group consisting of carnauba wax, anthracene, and pinene, approximately 4 parts of caoutchouc, and a filling medium.

3. A composition of matter capable of being molded into a hard and tough body for structural purposes comprising a mixture of 100 parts of cumarone resin, approximately 10 parts of a substance adapted to raise the melting temperature of the resin and selected from the group consisting of carnauba wax, anthracene, and pinene, approximately 150 parts of lithopone, and a filling medium.

4. A composition of matter capable of being molded into a hard and tough body for structural purposes comprising a mixture of 100 parts of cumarone resin, approximately 10 parts of a substance adapted to raise the melting temperature of the resin and selected from the group consisting of carnauba wax, anthracene, and pinene, approximately 150 parts of lithopone, and a filling medium, comprising broken marble and marble meal substantially in the proportion of 7:1.

In testimony whereof I hereunto affix my signature.

FELIX REIMANN.